US012160362B2

(12) United States Patent
Chadha

(10) Patent No.: US 12,160,362 B2
(45) Date of Patent: Dec. 3, 2024

(54) TRACEROUTE FOR MULTI-PATH ROUTING

(71) Applicant: Juniper Networks, Inc., Sunnyvale, CA (US)

(72) Inventor: Ankit Chadha, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 28 days.

(21) Appl. No.: 17/821,998

(22) Filed: Aug. 24, 2022

(65) Prior Publication Data

US 2022/0407800 A1 Dec. 22, 2022

Related U.S. Application Data

(63) Continuation of application No. 15/470,427, filed on Mar. 27, 2017, now abandoned.

(51) Int. Cl.
*H04L 45/24* (2022.01)
*H04L 41/00* (2022.01)
(Continued)

(52) U.S. Cl.
CPC .............. *H04L 45/24* (2013.01); *H04L 43/10* (2013.01); *H04L 45/26* (2013.01); *H04L 45/74* (2013.01);
(Continued)

(58) Field of Classification Search
CPC ......... H04L 45/24; H04L 43/10; H04L 45/26; H04L 45/74; H04L 47/286; H04L 41/12; H04L 41/20
See application file for complete search history.

(56) References Cited

U.S. PATENT DOCUMENTS 5,675,741 A * 10/1997 Aggarwal ............... H04L 45/20
709/227
6,173,411 B1 1/2001 Hirst et al.
(Continued)

FOREIGN PATENT DOCUMENTS

CN 101335689 A 12/2008
CN 101674633 6/2013
(Continued)

OTHER PUBLICATIONS

"ActiveXperts PING backgrounds (PING is part of the ActiveSocket Toolkit)," ActiveSocket Network Communication Toolkit 2.4, Activexperts, last printed Nov. 10, 2005, 3 pp.
(Continued)

*Primary Examiner* — Derrick W Ferris
*Assistant Examiner* — Chuong M Nguyen
(74) *Attorney, Agent, or Firm* — Shumaker & Sieffert, P.A.

(57) ABSTRACT

In general, techniques are described for extending network connectivity software utilities, such as traceroute, to provide complete visibility into a network topology between a source device and a destination device, even when an intermediate network device may be actively utilizing multiple network links when forwarding packets toward the destination. In one example, a network device coupled to a plurality of paths and positioned between a source network device and destination network device may receive a traceroute packet. The network device may also, for each of the plurality of paths, modify a payload of the traceroute packet to include a respective identifier for a corresponding path of the plurality of paths to construct a respective modified traceroute packet for the corresponding path. The network device may also forward the respective modified traceroute packets on the corresponding paths.

20 Claims, 8 Drawing Sheets

(51) Int. Cl.
  *H04L 41/12* (2022.01)
  *H04L 43/10* (2022.01)
  *H04L 45/00* (2022.01)
  *H04L 45/74* (2022.01)
  *H04L 47/28* (2022.01)

(52) U.S. Cl.
  CPC ............ *H04L 47/286* (2013.01); *H04L 41/12* (2013.01); *H04L 41/20* (2013.01)

(56) References Cited

U.S. PATENT DOCUMENTS

| | | | |
|---|---|---|---|
| 6,507,869 B1 | 1/2003 | Franke et al. | |
| 6,618,360 B1 | 9/2003 | Scoville et al. | |
| 6,850,253 B1 | 2/2005 | Bazerman et al. | |
| 6,982,953 B1 | 1/2006 | Swales | |
| 7,120,693 B2 | 10/2006 | Chang et al. | |
| 7,219,030 B2 | 5/2007 | Ohtani | |
| 7,391,719 B2 | 6/2008 | Ellis et al. | |
| 7,471,638 B2 | 12/2008 | Torrey et al. | |
| 7,523,185 B1 | 4/2009 | Ng et al. | |
| 7,596,097 B1* | 9/2009 | McCowan | H04L 43/00 370/359 |
| 7,639,624 B2 | 12/2009 | Mcgee et al. | |
| 7,706,278 B2* | 4/2010 | Wing | H04L 47/32 370/242 |
| 7,724,677 B2 | 5/2010 | Iwami | |
| 8,117,301 B2 | 2/2012 | Kompella | |
| 8,339,973 B1* | 12/2012 | Pichumani | H04L 43/10 370/248 |
| 8,483,069 B1* | 7/2013 | Bobade | H04L 43/106 370/244 |
| 8,670,326 B1 | 3/2014 | Balasubramanian et al. | |
| 8,953,460 B1* | 2/2015 | Addepalli | H04L 43/0811 370/241 |
| 9,124,529 B1* | 9/2015 | Chadha | H04L 45/02 |
| 2004/0073641 A1* | 4/2004 | Minhazuddin | H04L 43/024 709/221 |
| 2005/0259634 A1 | 11/2005 | Ross | |
| 2006/0095538 A1 | 5/2006 | Rehman et al. | |
| 2006/0182034 A1* | 8/2006 | Klinker | H04L 45/3065 370/248 |
| 2007/0041554 A1 | 2/2007 | Newman et al. | |
| 2007/0061103 A1 | 3/2007 | Patzschke et al. | |
| 2007/0192501 A1* | 8/2007 | Kompella | H04L 43/50 709/230 |
| 2007/0220252 A1 | 9/2007 | Sinko | |
| 2009/0019141 A1 | 1/2009 | Bush et al. | |
| 2009/0073924 A1* | 3/2009 | Chou | H04L 45/26 370/328 |
| 2011/0206035 A1* | 8/2011 | Lee | H04L 45/48 370/351 |
| 2011/0299406 A1* | 12/2011 | Vobbilisetty | H04L 43/10 370/248 |
| 2011/0317696 A1* | 12/2011 | Aldrin | H04L 12/1881 370/389 |
| 2012/0066165 A1* | 3/2012 | Drew | H04L 43/10 706/46 |
| 2012/0099443 A1* | 4/2012 | Makishima | H04L 43/0811 370/248 |
| 2012/0113901 A1* | 5/2012 | Jackson | H04W 76/50 370/328 |
| 2012/0127995 A1* | 5/2012 | Singh | H04L 45/302 370/392 |
| 2012/0207039 A1* | 8/2012 | Srinivasan | H04L 43/50 370/252 |
| 2012/0207161 A1 | 8/2012 | Uppalli et al. | |
| 2012/0303822 A1* | 11/2012 | Huang | H04L 65/61 709/227 |
| 2013/0163446 A1* | 6/2013 | Kruger | H04L 43/12 370/252 |
| 2013/0286859 A1* | 10/2013 | Wei | H04L 43/10 370/244 |
| 2013/0332602 A1 | 12/2013 | Nakil et al. | |
| 2014/0043962 A1* | 2/2014 | Rangan | H04L 41/0668 370/252 |
| 2015/0016298 A1* | 1/2015 | Ganichev | H04L 43/0894 370/253 |
| 2015/0036478 A1 | 2/2015 | Shah et al. | |
| 2015/0124629 A1* | 5/2015 | Pani | H04L 41/0836 370/248 |
| 2015/0127843 A1* | 5/2015 | Karaoguz | H04L 45/302 709/228 |
| 2016/0105336 A1 | 4/2016 | Sinha et al. | |
| 2016/0134481 A1* | 5/2016 | Akiya | H04L 43/55 709/224 |
| 2016/0142291 A1* | 5/2016 | Polland | H04L 43/10 370/392 |
| 2017/0117978 A1* | 4/2017 | Ko | H04L 45/32 |
| 2018/0278510 A1* | 9/2018 | Iqbal | H04L 47/125 |

FOREIGN PATENT DOCUMENTS

| | | |
|---|---|---|
| CN | 105634776 A | 6/2016 |
| EP | 1367750 A1 | 12/2003 |

OTHER PUBLICATIONS

"Configure an Unnumbered Interface," Juniper Networks, Inc., retrieved from www.juniper.nettechpubs/software/junos/junos56/index.html, last printed Nov. 7, 2005, 1 pp.

"Configure the Loopback Interface," Juniper Networks, Inc., retrieved from www.juniper.net/techpubs/software/junos/junos56/index/html, last printed Nov. 7, 2005, 2 pp.

"ICMP (Internet Control Message Protocol)," Data Network Resource, retrieved from www.rhyshaden.com/icmp.html, last printed Nov. 10, 2005, 4 pp.

"Traceroute," Webopedia, retrieved from www.webopedia.com/TERM/t/traceroute.html, Aug. 26, 2004, 1 pp.

"Using the IP unnumbered configuration FAQ," APNIC, Asian Pacific Network Information Centre, retrieved from www.apnic.net/info/faq/ip_unnumb.html, Jul. 1, 2005, 2 pp.

Atlas, "ICMP Extensions for Unnumbered Interfaces," Internet Draft, draft-atlas-icmp-unnumbered-00.txt, Dec. 9, 2005, 8 pp.

Atlas, "ICMP Extensions for Unnumbered Interfaces," Internet Draft, draft-atlas-icmp-unnumbered-01.txt, Feb. 2006, 8 pp.

Berkowitz, "Router Renumbering Guide," IETF Standard, Internet Engineering Task Force, RFC 2072, Jan. 1997, XP015007856, 41 pp.

Bonica et al., "Generic Tunnel Tracing Protocol (GTTP) Specification," IETF Standard-Working-Draft, Internet Engineering Task Force, Jul. 2001, XP015011025, 20 pp.

Conta et al. "Internet Control Message Protocol (ICMPv6) for the Internet Protocol Version 6 (IPv6) Specification," Network Working Group, Ther Internet Society, RFC 4443, Mar. 2006, 24 pps.

Examination Report from counterpart European Application No. 18152156.8, dated Oct. 2, 2019, 8 pp.

Extended Search Report from counterpart European Application No. 18152156.8, dated Jul. 31, 2018, 8 pp.

Fairhurst, "Internet Control Message Protocol," Internet Control Message Protocol (ICMP), accessed from http://www.erg.abdn.ac.uk/users/gorry/course/inet-pages/icmp.html, last printed Sep. 6, 2006, 3 pp.

First Office Action and Search Report, and translation thereof, from counterpart Chinese Application No. 201711465522.9, dated Apr. 12, 2021, 17 pp.

Hai-Feng, "Advanced TCP Port Scan and Its Response," O.I Automation 2005, vol. 24, No., 4, China Academic Electronic Publishing House, Apr. 24, 2005, accessed from http://cnki.net, 2 pp., Abstract only.

HOPPS "Analysis of an Equal-Cost Multi-Path Algorithm," IETF, RFC 2992, Nov. 2000, 8 pp.

Kessler et al., "A Primer On Internet and TCP/IP Tools and Utilities," Network Working Group, RFC 2151, Jun. 1997, 52 pp.

Kompella et al., "Signalling Unnumbered Links in Resource ReSerVation Protocol—Traffic Engineering (RSVP-TE)," Network Working

(56) References Cited

OTHER PUBLICATIONS

Group, IETF Standard-Working-Draft, Internet Engineering Task Force, RFC 3477, Jan. 2003, 8 pp.

Mannie, "Generalized Multi-Protocol Label Switching Architecture," IETF Standard-Working-Draft, Internet Engineering Task Force, May 2003, 56 pp.

Notice of Intent to Grant and Text Intended to Grant from counterpart European Application No. 18152156.8 dated Mar. 31, 2021, 43 pp.

Notice of Intent to Grant and Text Intended to Grant from counterpart European Application No. 18152156.8 dated Oct. 22, 2020, 49 pp.

POSTEL "Internet Control Message Protocol," Network Working Group, Internet Engineering Task Force, RFC 792, Sep. 1981, 21 pp.

POSTEL "User Datagram Protocol," Network Working Group, Internet Engineering Task Force, RFC 768, Aug. 28, 1980, 3 pp.

Prosecution History from U.S. Appl. No. 15/470,427, dated Jul. 25, 2018 through Feb. 24, 2022, 429 pp.

Response to Communication Pursuant to Rule 71.3 EPC dated Oct. 22, 2020, from counterpart European Application No. 18152156.8, Feb. 22, 2021, 12 pp.

Response to Examination Report dated Oct. 2, 2019, from counterpart European Application No. 18152156.8, filed Feb. 3, 2020, 9 pp.

Response to Extended Search Report dated Jul. 31, 2018, from counterpart European Application No. 18152156.8, filed Apr. 1, 2019, 15 pp.

Rosen et al., "Multiprotocol Label Switching Architecture," Network Working Group, Internet Engineering Task Force, RFC 3031, Jan. 2001, 61 pp.

Thaler et al., "Multipath Issues in Unicast and Multicast Next-Hop Selection," Network Working Group, Internet Engineering Task Force, RFC 2991, Nov. 2000, 9 pp.

Vijay Mukhi et al., "Internet Control Message Protocol ICMP," Internet Control Message Protocol (ICMP), accessed from http://www.geocities.ws/dvalladares66/hwct/Intranet5/icmp.html, last printed Sep. 6, 2006, 5 pp.

Zimmermann, "OSI Reference Model—The ISO Model of Architecture for Open Systems Interconnection," IEEE Transactions on Communications, vol. 28, No. 4, Apr. 1980, pp. 425-432.

Zvon, [Router Renumbering Guide]—Router Identifiers, Chapter 8.3 Unnumbered Interfaces, RFC 2072, accessed from www.zvon.org/tmRFC/RFC2072/Output/chapter8.html, last printed Nov. 7, 2005, 2 pp.

\* cited by examiner

TRACEROUTE FOR MULTI-PATH ROUTING

This application is a continuation of U.S. patent application Ser. No. 15/470,427, filed 27 Mar. 2017, the entire contents of which is incorporated herein by reference.

TECHNICAL FIELD

The invention relates to computer networks and, more particularly, to software utilities for determining the status of computer network connections.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Various software utilities exist for identifying failed connectivity between two nodes of a network and for exploring network topology. One such utility, referred to as traceroute, allows a source network device to identify a network path from the source network device to a destination network device. The traceroute utility determines the network path to a target network device by recording an Internet Control Message Protocol (ICMP) echo request packet's path from the source device to a specified network destination. As output, the traceroute typically displays how many hops the packet traveled to reach the network destination, identifies each hop along the path by its network address, and shows the round-trip time for reaching each hop.

SUMMARY

In general, this disclosure describes techniques for extending network connectivity software utilities, such as traceroute, to provide complete visibility into a network topology between a source device and a destination device, even when an intermediate network device may be actively utilizing multiple network links when forwarding packets toward the destination. For example, a network device in the network path, such as an intermediate router, may be configured to actively utilize multiple paths, i.e., links, when forwarding traffic to reach a destination network device. As one example, the intermediate device may be configured to generally apply equal cost multi-path for forwarding packets on any of a set of active links based on a hashing operation. As described herein, to facilitate exploration of the network topology of each of the multiple paths, the intermediate network device may utilize respective sessions to track forwarding of a corresponding traceroute packet along each of the active multiple paths. For example, in response to receiving a traceroute packet specifying the network destination, the intermediate network device may configure and output a respective modified traceroute packet on each of the corresponding paths leading from the network device toward the destination. The respective modified traceroute packets may each include a respective identifier associated with the corresponding path of the multiple paths. The network device forwards the respective modified traceroute packets along the corresponding paths such that each path may be traced by its respective traceroute packet. A subsequent network device along each of the paths, such as a next hop router or the destination device, receives the modified traceroute packet for a given path and configures a response to include an identifier associated with the corresponding path. In this way, the network device may associate the response with the particular path along which the modified traceroute packet was forwarded to the network device. When the source network device has received a response for each of the multiple active paths, the source network device updates the results of the traceroute utility to reflect each of the multiple paths within the network and configures a new traceroute packet with an incremented Time-to-Live (TTL) value and sends the traceroute packet towards the destination network device. The source network device continues this process until a response is received from the destination network device. In this way, the traceroute packets and the responses may provide source network device with complete visibility even when a given intermediate device may be actively forwarding packets destined for the destination, even for the same packet flow, along multiple network paths.

In one example, a method may include receiving, by a network device coupled to a plurality of paths for reaching a destination network device and positioned between a source network device and the destination network device, a traceroute packet. The method may also include, for each of the plurality of paths, modifying, by the network device, a payload of the traceroute packet to include a respective identifier for a corresponding path of the plurality of paths to construct a respective modified traceroute packet for the corresponding path. The method may also include forwarding, by the network device, the respective modified traceroute packets on the corresponding paths.

In another example, a method may include sending, by a source network device, a traceroute packet to an intermediate network device coupled to a plurality of paths for reaching a destination network device, wherein the intermediate network device is positioned between the source network device and the destination network device. The method may also include receiving, by the source network device and from the intermediate network device, one or more respective responses, wherein each of the one or more respective responses comprises a payload including a respective identifier for a corresponding path of the plurality of paths.

In another example, a network device may include a plurality of network interfaces, each of the network interfaces coupled to a different one of a plurality of paths for reaching a destination network device, wherein the network device is positioned between a source network device and the destination network device. The network device may also include one or more hardware-based processors configured to: receive a traceroute packet destined for the destination device; for each of the plurality of paths, modify a payload of the traceroute packet to include a respective identifier for a corresponding path of the plurality of paths to construct a respective modified traceroute packet for the corresponding path; and forward the respective modified traceroute packets on the corresponding paths.

In another example, a source network device may include one or more hardware-based processors configured to: send a traceroute packet toward a destination network device; and receive one or more respective responses, wherein each of the one or more respective responses comprises a payload including a respective identifier for a corresponding path of a plurality of paths of an intermediate network device, wherein the intermediate network device is positioned between the source network device and the destination network device.

The details of one or more examples are set forth in the accompanying drawings and the description below. Other features, objects, and advantages will be apparent from the description and drawings, and from the claims.

DETAILED DESCRIPTION

Figure 1:
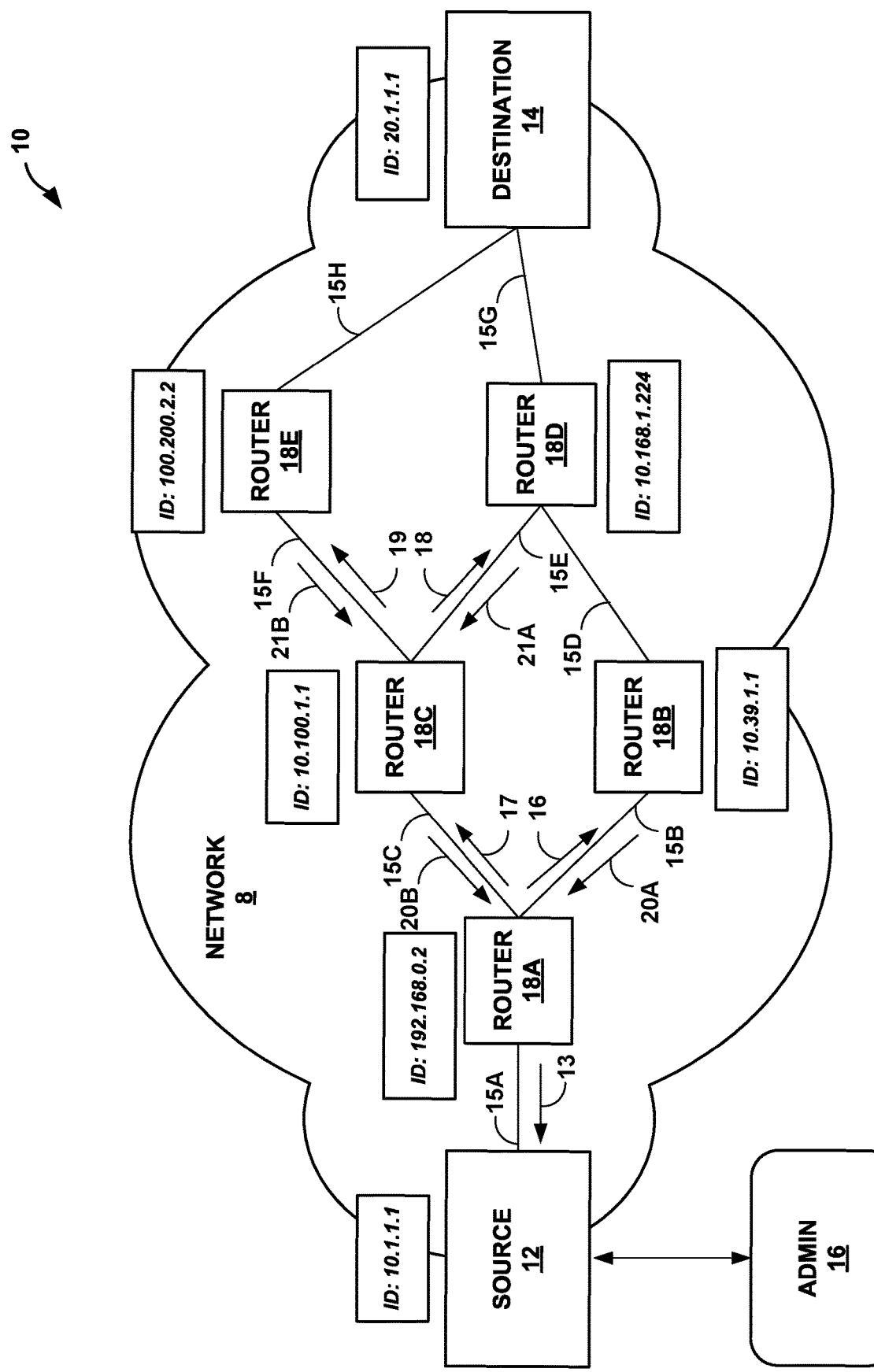
FIG. 1 is a block diagram illustrating an example network system in which intermediate network devices have been enhanced so as to enable a software utility, such as traceroute, to trace and report on connectivity information from a source destination to a destination device, even when one or more of the intermediate network device utilize multiple, active links when forwarding packets of the utility toward the destination.

FIG. 1 is a block diagram illustrating an example network system in which intermediate network devices have been enhanced so as to enable a software utility, such as traceroute, to trace and report on connectivity information from a source destination to a destination device, even when one or more of the intermediate network device utilize multiple, active links when forwarding packets of the utility toward the destination. In the example of FIG. 1, source network device 12 and network device 18A-18E (collectively, "network devices 18" or "routers 18") support use of the extended traceroute that has been extended to facilitate exploration of a network topology of each of the multiple paths when forwarding traffic to reach a destination network device.

In this example, network system 10 includes source network device 12 and destination network device 14 connected across network 8 via intermediate routers, switches, and other network devices, shown for purposes of examples as routers 18. Network 8 may comprise a public network such as the Internet, a private network, such as those owned and operated by an enterprise or service provider or a combination of both public and private networks. As a result, network 8 may be alternatively referred to herein as a Service Provider (SP) network. Network 8 may include one or more Wide Area Networks (WANs), Local Area Networks (LANs), Virtual Local Area Networks (VLANs), Virtual Private Networks (VPNs), and/or another type of network.

In some examples, network 8 may be an Internet Protocol (IP) network in which routers 18 use IP forwarding for transporting network packets. In other instances, network 8 may be a label switching network in which network devices such as routers 18, often referred to as Label Switching Routers or LSRs, use Multi-Protocol Label Switching (MPLS) signaling protocols to establish Label Switched Paths (LSPs) for transporting the network packets received from source devices 12. The MPLS data-carrying mechanism of network 8 may be viewed as lying between layer 2 and layer 3 of the Open Systems Interconnection (OSI) model and is often referred to as a layer 2.5 protocol. Reference to layers followed by a numeral may refer to a particular layer of the OSI model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Further information regarding MPLS and the various features of MPLS, as well as, general architectural information regarding MPLS can be found in Request for Comments (RFC) 3031, titled "Multiprotocol Label Switching Architecture," prepared by the Network Working Group of the Internet Engineering Task Force (IETF), dated January 2001, incorporated by reference herein.

Although shown as a single network in FIG. 1, network 8 may comprise any number of interconnected networks, either public or private, in which the various networks interconnect to form various virtual networks. In addition, network 8 may include a variety of other network devices for forwarding network traffic, such as additional routers, switches, or bridges. The particular configuration of network system 10 is merely an example, and routers 18 may reside in a single network or within multiple networks. Although described with respect to routers, aspects of the techniques are applicable to other network devices, such as bridges, switches, gateways, network caches, and network acceleration devices.

In the example of FIG. 1, source network device 12 and destination network device 14 may each be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with and communicating over network 8.

A number of physical and/or virtual communication links 15A-15H (collectively, "links 15") of network 8 interconnect routers 18 to facilitate control and data communication between the routers. Physical links of network 8 may include, for example, Ethernet PHY, Synchronous Optical Networking (SONET)/Synchronous Digital Hierarchy (SDH), Lambda, or other Layer 2 data links that include packet transport capability. Logical links of network 8 may include, for example, an Ethernet Virtual LAN, an MPLS LSP, or an MPLS-TE LSP.

In this example, source network device 12 connects to network 8 via access link 15A, destination network device 14 connects to network 8 via access links 15G and/or 15H, and routers 18 communicate via access links 15B-15F. Access links 15 may comprise wired and/or wireless communication links. The term "communication link," as used herein, comprises any form of transport medium, wired or wireless, and can include intermediate nodes such as network devices. Each of access links 15 may comprise, for instance, aspects of an asymmetric DSL network, WiMAX, a T-1 line, an Integrated Service Digital Network (ISDN), or wired Ethernet.

Routers 18 maintain routing information that describes available routes through network 8. Upon receiving an incoming packet, the receiving router examines information within the packet and forwards the packet in accordance with the routing information. In order to maintain an accurate representation of network 8, the routers exchange routing information, e.g., bandwidth availability of links, in accordance with a defined routing protocol, such as an Interior Gateway Protocol (IGP), Open Shortest Path First (OSPF), Intermediate System-Intermediate System (IS-IS) or Routing Information Protocol (RIP).

Various routing protocols allow for "Equal-Cost Multipath" (ECMP) routing. ECMP provides a routing technique by which a router may forward packets destined for a particular destination device along any of a plurality of paths (links) of equal cost, in this example. A router implementing ECMP may identify, when forwarding a packet, which next-hop (path) of a plurality of next-hops to use, and may output the packet on a given link based on the selection. For example, the router may determine the next-hop using hash-threshold, Modulo-N, and/or Highest random weight (HRW) techniques. Further information regarding ECMP can be found in Request for Comments (RFC) 2991, titled "Multipath Issues in Unicast and Multicast Next-Hop Selection," prepared by the Network Working Group of the Internet Engineering Task Force (IETF), dated November 2000, and RFC 2992, titled "Analysis of an Equal-Cost Multi-Path Algorithm," IETF, dated November 2000, both incorporated by reference herein. Although the paths in FIG. 1 are illustrated with respect to Equal-Cost Multi-Path (ECMP) paths, network system 10 may include other types of multipath routing. The techniques described herein are not limited to ECMP topologies and may be advantageous in any network where an intermediate device is actively forward packets destined for a destination device, even traceroute packets targeting the destination device, along any of a plurality of paths toward the destination. Other examples include weighted ECMP.

For example, various software utilities, such as traceroute, are useful tools for identifying failed connectivity and for exploring network topology between two nodes of a network. Source network device 12 may typically use traceroute to identify a network path from source network device 12 to destination network device 14. Using traceroute, source network device 12 sends a traceroute packet towards destination network device 14.

Source network device 12 may implement traceroute and send a traceroute packet toward destination network device 14 with an initial hop count, e.g., a Time-to-Live (TTL) value. At each hop, a receiving router (e.g., "intermediary router") processes the traceroute packet and decrements the hop count. When the hop count is zero, the router typically sends a response, e.g., TTL expired message, port-unreachable, and Error/TimeOut packets, back to source network device 12 informing the source network device that the packet was received and the hop count has expired. Source network device 12 receives the response and configures a traceroute tree based on the response. Source network device 12 proceeds to send another traceroute packet with an incremented TTL value such that the traceroute packet reaches the next device in the path, and continues this process until the destination device is reached.

However, when a router, e.g., router 18A, is configured to forward packets toward a destination network using any of a plurality of active paths, each time a traceroute packet is sent with an incremented TTL value, the traceroute packet may use a different port number from previous traceroute packets. As such, router 18A may forward the traceroute packet toward the destination network device along a different one of 15B, 15C since the port-number is often considered when calculating the next-hop hash, e.g., part of a 5-tuple. The 5-tuple within a header of a packet, such as the traceroute packet being forwarded, may include: <source network address, destination network address, source port, destination port, protocol>, for example. As such, the trace of a network path of a network device (e.g., router 18A) applying ECMP or other technique to actively forward packets destined for the same destination along multiple paths often results in tracing different branches of the multiple paths. As a result, the traceroute responses do not provide source network device 12 a complete picture of each path of router 18A's multiple paths, and the conventional traceroute utility provides incomplete or inaccurate results, if any.

In accordance with the techniques of this disclosure, intermediate devices, such as routers 18, are configured to enhance the traceroute packets to provide complete visibility of multiple paths of a network device. For example, responsive to receiving a traceroute packet to be forwarded toward the destination, any of routers 18 currently applying ECMP or other technique to actively utilize multiple paths toward the destination may generate, configure and output a respective modified traceroute packet along each of the multiple paths such that each of the paths may be individually identified.

In operation, administrator 16 accesses source network device 12 and invokes a diagnostic software utility, such as traceroute, to initiate a traceroute request. In response, the software utility executing on source device 12 may configure a traceroute packet, e.g., protocol data unit (PDU) packet, with an identifier associated with a network path for which the traceroute packet is to be forwarded on. For example, source network device 12 may initially configure a traceroute packet with a TTL value of one and may include a "session-stack" in the traceroute payload comprising a network address of source network device 12 and a session identifier representing the path to router 18A. That is, the session-stack may indicate the forwarding network device and the path that the packet was forwarded. For illustration purposes, source network device 12 may configure the session-stack as 10.1.1.1:1, which includes the IP address of source network device 12 (e.g., 10.1.1.1) and a session number of one that is associated with the single next-hop path from source device 12.

Source network device 12 may send the traceroute packet upstream towards destination network device 14. Router 18A may receive the traceroute packet. In this example, router 18A may process the traceroute packet by decrementing the TTL value and determining whether the TTL value is zero. In this example, router 18A may determine that the TTL value is zero and may configure a response packet, e.g., a TTL expired packet, to include a payload having a "reverse-session-stack" with values copied from the received session-stack (e.g., 10.1.1.1:1). Router 18A sends the response packet back toward source network device 12. Source network device 12 receives the response packet and may determine, based on the reverse-session-stack of the response packet, that router 18A is the next-hop for source device 12 along a single path via access link 15A.

Continuing the traceroute process, source device 12 may configure and send a new traceroute packet with an incremented TTL value toward destination network device 14 to identify the one or more next-hops in the path. For example, source network device 12 may send another traceroute packet as described above (e.g., 10.1.1.1:1) with an incremented TTL value of two. When router 18A receives the traceroute packet, router 18A decrements the TTL value and determines that the TTL value is greater than one. In response, router 18A may forward the traceroute packet to a next-hop.

Prior to forwarding the traceroute packet, router 18A may output a message to inform source network device 12 as to the number of active forwarding paths (links 15B, 15C) available to router 18A for reaching destination network device 14. Because router 18A is configured to select between any of the active multiple paths for the traceroute packet, router 18A may configure respective modified traceroute packets for each of the multiple paths. In the example of FIG. 1, router 18A may perform a destination lookup on the received traceroute packet and determine, based on its internal routing information, that it is configured to forward packets destined for the destination along any of two active paths, i.e., the paths leading to routers 18B, 18C, respectively. Router 18A may inform source network device 12 as to the existence of the two viable paths for the traceroute packet. In some examples, router 18A may inform source network device 12 of the number of paths by configuring an indicator 13 such as a new utility PDU packet to include a tally of the next-hop paths and/or network addresses of next-hop routers on the next-hop paths. In the example of FIG. 1, routers 18B, 18C are each a next-hop router to router 18A via links 15B, 15C, respectively. For illustration purposes, router 18B may have an IP address of 10.39.1.1 and router 18C may have an IP address of 10.100.1.1. Router 18A may configure a new utility PDU packet as a list of strings, e.g., {2, 10.39.1.1, 10.100.1.1}, to inform source network device 12 that router 18A has two next-hop paths to routers 18B and 18C, for example. Router 18A may send indicator 13 to source network device 12.

Source network device 12 may receive indicator 13 and may delay constructing a new traceroute packet with an incremented TTL value until it determines, based on indicator 13, that it has received a response to the corresponding traceroute packets generated by router 18A and output along each of the multiple paths leading from router 18A toward the destination.

Router 18A may configure a respective modified traceroute packet to be forwarded to each of the paths to routers 18B and 18C. For example, router 18A may modify the received traceroute packet to include a respective identifier associated with a path to router 18B. In another example, router 18A may modify the received traceroute packet to include a respective identifier associated with a path to router 18C.

In particular, router 18A may configure respective identifiers representing sessions 16, 17 for each path to router 18B and router 18C, respectively. For example, router 18A may configure one modified traceroute packet to include an identifier representing the path to router 18B, which is denoted by session 16. Router 18A may send the modified traceroute packet to router 18B via access link 15B.

In another example, router 18A may also configure another modified traceroute packet to include an identifier representing the path to router 18C, which is denoted by session 17. Router 18A may send this modified traceroute packet to router 18C via access link 15C. In some examples, router 18A may send the respective modified traceroute packets to the corresponding paths in parallel. In other examples, router 18A may send the respective modified traceroute packets to the corresponding paths sequentially. In any event, router 18A may send a respective modified traceroute packet on the corresponding paths to trace the next-hop along each of the paths to routers 18B and 18C.

For session 16, router 18A may, for example, modify a payload of the traceroute packet to include a session-stack that comprises at least its network address (e.g., 192, 168.0.2) and a session identifier (e.g., 1) that associates router 18A with the path to router 18B via link 15B. Router 18A may send the modified traceroute packet on access link 15B toward router 18B. Router 18B receives the modified traceroute packet, decrements the TTL value, and may determine that the TTL value is zero for which router 18B is to construct response 20A. In this example, router 18B may configure a TTL expired packet with a reverse-session-stack that may include the session-stack value received from router 18A (e.g., 10.1.1.1:1, 192.168.0.2:1).

For session 17, router 18A may, for example, modify a payload of the traceroute packet to include a session-stack that comprises at least its network address (e.g., 192.168.0.2) and a session number (e.g., 2) that associates router 18A with the path to router 18C via link 15C (e.g., session 17). Router 18A may send the modified traceroute packet on access link 15C toward router 18C. Router 18C receives the modified traceroute packet, decrements the TTL value, and determines that the TTL value is zero for which router 18C is to construct response 20B. In this example, router 18C may configure a TTL expired packet with a reverse-session-stack that includes the session-stack value received from router 18A (e.g., 10.1.1.1:1, 192.168.0.2:2).

Routers 18B and 18C may each send their response (e.g., 20A, 20B) downstream toward router 18A. Source network device 12 may receive responses 20A, 20B with their respective reverse-session stacks, and may determine, from the respective identifiers, that router 18B is a next-hop for one path of router 18A, and router 18C is a next-hop for another path of router 18A. For example, source network device 12 may receive from router 18B a response including a reverse-session-stack of "10.1.1.1:1, 192.168.0.2:1" for which source network device 12 may determine that router 18B is associated with session identifier "1," which represents the trace for session 16. Source network device 12 may also receive from router 18C a response including a reverse-session-stack of "10.1.1.1:1, 192,168.0.2:2" for which source network device 12 may determine that router 18C is associated with session identifier "2," which represents the trace for session 17.

As described above, source network device 12 may determine from indicator 13 that router 18A has two paths. Based on the information from indicator 13, source network device 12 may configure a new traceroute packet with an incremented TTL value when a response is received for all paths of router 18A. For example, when source network device 12 receives a response from router 18B with an identifier of a path from router 18A to router 18B and a response from router 18C with an identifier of a path from router 18A to router 18C, source network device 12 may determine, based on indicator 13, that a response was received for all paths of router 18A. In response, router 18A may configure a traceroute tree of the paths of router 18A and may configure a new traceroute packet with an incremented TTL value. Source network device 12 may send the new traceroute packet towards destination network device 14 to identify the next-hop in the path.

Continuing the above example, source network device 12 may increment the TTL value to three and send a new traceroute packet (e.g., 10.1.1.1:1) toward destination network device 14. Since the TTL value is greater than one, router 18A may forward the traceroute packet after modifying the traceroute packet to include its network address and a respective session identifier associated with a corresponding next-hop path connected to the router.

For session 16, router 18A decrements the TTL value to two and modifies the received traceroute packet having a current session-stack (e.g., 10.1.1.1:1) to include the network address of router 18A (e.g., 192.168.0.2) and a session number (e.g., 1) to construct a modified traceroute packet with an updated session-stack (e.g., 10.1.1.1:1, 192.168.0.2:1) that represents the path from source network device 12 to router 18B.

When router 18B receives the modified traceroute packet from router 18A, router 18B decrements the TTL value and determines that the TTL value is not zero for which router 18B is to forward the modified traceroute to its next-hop. Router 18B may perform a destination lookup and determine that router 18B has a single path to router 18D. Router 18B configures an indicator (not shown) to inform source network device 12 of the number of paths available to router 18B. For example, router 18B may configure a new utility PDU packet as {1, 10.168.1.224}, which may include a tally of available next-hop paths (e.g., 1) to router 18B and the network address of router 18D (e.g., 10.168.1.224) that is coupled to the path. Router 18B may send the new utility PDU packet to source network device 12 such that source network device 12 is informed of the number of paths for router 18B.

Prior to forwarding the modified traceroute packet, router 18B may further modify the modified traceroute packet to include an identifier representing the path to router 18D. In the example of FIG. 1, router 18B may further modify the modified traceroute packet that has a current session-stack (e.g., 10.1.1.1:1, 192.168.0.2:1) to include its network address (e.g., 10.39.1.1) and a session identifier (e.g., 1) to construct a modified traceroute packet having an updated session-stack (e.g., 10.1.1.1:1, 192.168.0.2:1, 10.39.1.1:1) to represent a path from source network device 12 to router 18D. Router 18B then sends the modified traceroute packet to router 18D.

Router 18D receives the modified traceroute packet, decrements the TTL value, and may determine that the TTL value is zero for which router 18D is to construct a response. In this example, router 18D may configure a TTL expired packet with a reverse-session-stack copied from the updated session-stack received from router 18B, and sends the response downstream toward source network device 12. Source network device 12 may receive the response with the reverse-session-stack, and may determine, from an identifier in the updated session-stack, that router 18D is a next-next-hop for one path of router 18A. As a response was received from all paths of router 18B, source network device 12 may update the traceroute tree to include routers 18B and 18D as the next-hop, and next-next-hop for session 16 of router 18A.

Similarly, for session 17, router 18A decrements the TTL value to two and modifies the received traceroute packet having a current session-stack (e.g., 10.1.1.1:1) to include the network address of router 18A (e.g., 192.168.0.2) and a session identifier (e.g., 2) to construct a modified traceroute packet with an updated session-stack (e.g., 10.1.1.1:1, 192.168.0.2:2) that represents the path from router 18A to router 18C. When router 18C receives the modified traceroute packet from router 18A, router 18C decrements the TTL value and determines that the TTL value not zero for which router 18C is to forward the modified traceroute packet to its next-hop. Router 18C may perform a destination lookup and determine that it has two paths to routers 18D, 18E, respectively. Router 18C may configure an indicator (not shown) to inform source network device 12 of the number of paths. For example, router 18D may configure a new utility PDU packet as {2, 10.168.1.224, 100.200.2.2}, which may include a tally of the available next-hops (e.g., 2) to routers 18D and 18E, respectively, and include the network addresses of router 18D (e.g., 10.168.1.224) and router 18E (e.g., 100.200.2.2) that is coupled to the paths. Router 18D may send the indicator to source network device 12 such that source network device 12 is informed of the number of paths for router 18D.

In one example, router 18C may configure respective identifiers representing sessions 18, 19 for each path to router 18D and router 18E, respectively. For example, router 18C may configure one modified traceroute packet to include an identifier representing the path to router 18D, which is denoted by session 18. Router 18C may send the modified traceroute packet to router 18D via access link 15E.

In another example, router 18C may also configure another modified traceroute packet to include an identifier representing the path to router 18E, which is denoted by session 19. Router 18C may send this modified traceroute packet to router 18E via access link 15F. In some examples, router 18C may send the respective modified traceroute packets to the corresponding paths in parallel, and in other examples, may send the respective modified traceroute packets to the corresponding paths sequentially. In any event, router 18C may send a respective modified traceroute packet on the corresponding paths to trace the next-hop along each of the paths to routers 18D and 18E.

For session 18, router 18C may, for example, further modify the payload of the modified traceroute packet to include a session-stack comprising at least its network address (e.g., 10.100.1.1) and a session identifier (e.g., 1) that associates router 18C with the path to router 18D via link 15E (e.g., session 18). That is, router 18C may modify the current session-stack (e.g., 10.1.1.1:1, 192.168.0.2:2) with the above information to construct an updated session-stack (e.g., 10.1.1.1:1, 192.168.0.2:2, 10.100.1.1:1) to represent the path to router 18D. Router 18C may send the modified traceroute packet on access link 15E toward router 18D.

Router 18D receives the modified traceroute packet, decrements the TTL value, and may determine that the TTL value is zero for which router 18D is to construct response 21A. In this example, router 18D may configure a TTL expired packet with a reverse-session-stack that includes the session-stack value received from router 18C. Router 18D sends the response with the reverse-session-stack downstream toward source network device 12.

For session 19, router 18C may, for example, further modify the payload of the modified traceroute packet to include a session-stack comprising at least its network address (e.g., 10.100.1.1) and a session identifier (e.g., 2) that associates router 18C with the path to router 18E via link 15F (e.g., session 19). That is, router 18 C may modify the current session-stack (e.g., 10.1.1.1:1, 192.168.0.2:2) with the above information to construct an updated session-stack (e.g., 10.1.1.1:1, 192.168.0.2:2, 10.100.1.1:2) to represent the path to router 18E. Router 18C may send the modified traceroute packet on access link 15F toward router 18E.

Router 18E receives the modified traceroute packet, decrements the TTL value, and may determine that the TTL value is zero for which router 18E is to construct response 21B. In this example, router 18E may configure a TTL expired packet with a reverse-session-stack that includes the session-stack received from router 18C, and send the response downstream toward source network device 12.

Source network device 12 may receive responses 21A, 21B with their respective reverse-session stacks, and may determine, from the respective identifiers, that router 18D is a next-hop for one path of router 18C and router 18E is a next-hop for another path of router 18C. In accordance with the techniques described herein, source device 12 may determine that one path to reach router 18D includes routers 18A, 18B, and another path to reach router 18D includes routers 18A, 18C. That is, source device 12 may trace the paths for each of the ECMP routes. For example, source network device 12 may receive from router 18D a response including a reverse-session-stack of "10.1.1.1:1, 192.168.0.2:2, 10.100.1.1:1" for which source network device 12 may determine that router 18D is associated with session identifier "1," which represents the trace for session 18. Source network device 12 may also receive from router 18E a response including a reverse-session-stack of "10.1.1.1:1, 192,168.0.2:2, 10.100.1.1:2" for which source network device 12 may determine that router 18C is associated with session identifier "2," which represents the trace for session 19.

Figure 2:
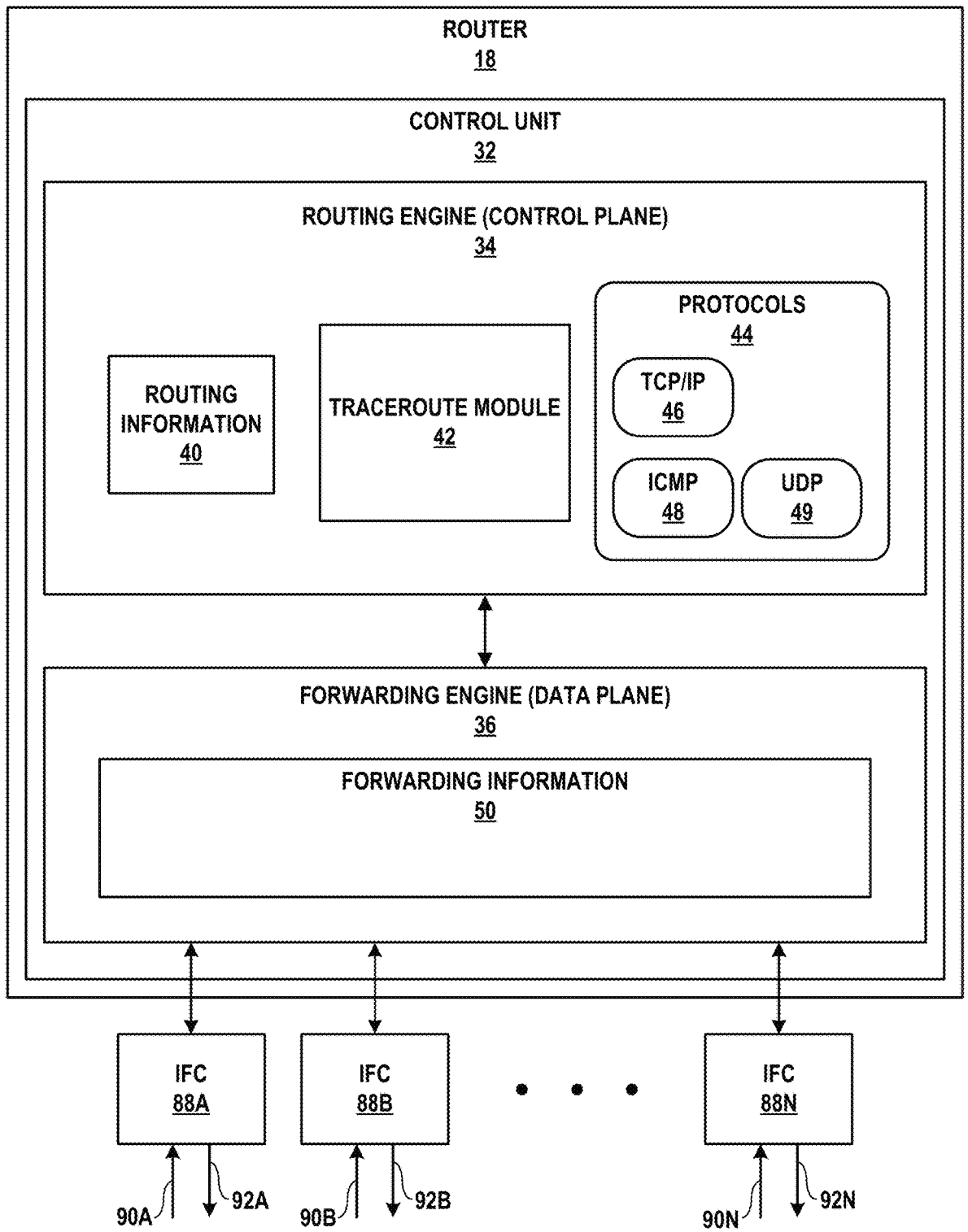
FIG. 2 is a block diagram illustrating an example of a router, in accordance with the techniques of described in this disclosure.

When source network device 12 receives all responses for sessions 18, 19 of router 18C, source network device 12 may send a new traceroute packet with an incremented TTL value upstream towards destination network device 14. Source network device 12 continues this process until a response from destination network device 14 is received. As one example, source network device 12 may send a traceroute packet with a TTL value of four towards destination network device 14, such that destination device 14 receives the traceroute packet from either routers 18D or 18E and returns a port-unreachable message to signal the trace is complete. In response, source network device 12 may configure a final traceroute tree based on the responses, which is logically represented as:

1. Router 18A-Router 18B-Router 18D-Destination
2. Router 18A-Router 18C:
    a. Router 18A-Router 18C-Router 18D-Destination
    b. Router 18A-Router 18C-Router 18E-Destination FIG. 2 is a block diagram illustrating an example of a router, in accordance with the techniques of described in this disclosure. In the example of FIG. 2, router 18 may represent any of routers 18 of FIG. 1. Router 18 includes a control unit 32 that includes a routing engine 34. Router 18 includes interface cards 88A-88N (collectively, "IFCs 88") that send and receive packet flows via inbound network links 90A-90N (collectively, "inbound network links 90") and outbound network links 92A-92N (collectively, "outbound network links 92"), respectively. IFCs 88 are typically coupled to links 90, 92 via a number of interface ports (not shown). Inbound links 90 and outbound links 92 may represent physical interfaces, logical interfaces, or some combination thereof.

Routing engine 34 provides an operating environment for various protocols 44 that execute at different layers of a network stack. Routing engine 34 is responsible for the maintenance of routing information 40 to reflect the current topology of a network and other network entities to which router 18 is connected. In particular, routing protocols periodically update routing information 40 to accurately reflect the topology of the network and other entities based on routing protocol messages received by router 18. The protocols may be software processes executing on one or more processors. For example, routing engine 34 includes network protocols that operate at a network layer of the network stack. In the example of FIG. 2, network protocols include TCP/IP 46.

Routing engine 34 may also include various messaging protocols, including Internet Control Message Protocol (ICMP) 48 and User Datagram Protocol (UDP) 49 to implement traceroute techniques described in this disclosure. ICMP 48 may include ICMP version 4, as illustrated in Request for Comments (RFC) 792, titled "Internet Control Message Protocol," prepared by the Network Working Group of the Internet Engineering Task Force (IETF), dated September 1981, and ICMP version 6, as illustrated in Request for Comments (RFC) 4443, titled "Internet Control Message Protocol (ICMPv6) for the Internet Protocol Version 6 (IPv6), both incorporated by reference herein. Router 18 may use ICMP 48 to convey control information, such as an ICMP traceroute request, to source network device 12. UDP 49 may also provide a procedure for which router 18A may send traceroute messages to other network devices, as illustrated in Request for Comments (RFC) 768, titled "User Datagram Protocol," dated Aug. 28, 1980, incorporated by reference herein. Routing engine 34 may include other routing and/or messaging protocols not shown in FIG. 2.

Routing engine 34 may also include a traceroute module 42. In one example, traceroute module 42 may execute in the control plane of router 18. Although the examples of traceroute module 42 are described with respect to the control plane, traceroute module 42 may be configured to execute in either the control plane, the forwarding plane, or both.

In one example, router 18 may receive a traceroute packet including a TTL value from any of inbound links 90. In one example, forwarding engine 36 may decrement the TTL value and determine that the TTL value is not zero. In this example, traceroute module 42 may determine a number of paths from router 18 that are reachable to destination network device 14. Traceroute module 42 may configure an indicator to inform source network device 12 of the next-hop paths of the router. For example, traceroute module 42 may configure a new utility PDU packet to include a tally of the network paths available to router 18 that are reachable to the destination network device. In some examples, traceroute module 42 may include in the new utility PDU packet one or more network addresses of next-hop routers on those paths. Traceroute module 42 may forward the indicator to forwarding engine 36 such that the indicator is forwarded on any of outbound links 92 to source network device 12.

Traceroute module 42 may also modify the traceroute packet to include an identifier of a corresponding path of a plurality of paths of router 18. In some examples, router 18 may construct a new traceroute packet to include the identifier. In other examples, router 18 may modify an existing traceroute packet to include the identifier.

In any event, traceroute module 42 may modify a payload of the received traceroute packet to include a network address of router 18 and/or a session identifier to associate with a corresponding path for which the traceroute packet was forwarded to router 18. In some examples, the traceroute packet may, as described above, include a current session-stack that comprises one or more network addresses of network devices that forwarded the traceroute packet and one or more session identifiers of the path for which the traceroute packet was forwarded. That is, the traceroute packet may identify the path from source network device 12 to router 18. In this way, traceroute module 42 may construct, for a corresponding path, an updated session-stack to include one or more network addresses from source network device 12 to router 18.

In another example, router 18 may receive a traceroute packet including a TTL value from any of inbound links 90. Forwarding engine 36 may decrement the TTL value and determine that the TTL value is zero. In response, forwarding engine 36 may forward the traceroute packet to routing engine 34 such that traceroute module 42 may configure an extended traceroute response, in accordance with the techniques described herein. For example, traceroute module 42 may construct a TTL expired message to include a reverse-session-stack within a payload of the response that comprises an identifier associated with the corresponding path for which the traceroute packet was forwarded to router 18. In one example, traceroute module 42 may copy the session-stack received from the traceroute packet to the reverse-session-stack of the response. That is, the reverse-session-stack may comprise one or more network addresses leading up to router 18 and/or one or more session identifiers of the path for which the traceroute packet was forwarded to router 18.

Forwarding engine 36 represents hardware and logic functions that provide high-speed forwarding of network traffic. Forwarding engine 36 typically includes a set of one or more forwarding chips programmed with forwarding information that maps network destinations with specific next hops and the corresponding output interface ports. In the example of FIG. 2, forwarding engine 36 includes forwarding information 50. In accordance with routing information 40, forwarding engine 36 maintains forwarding information 50 that associates network destinations with specific next hops and corresponding interface ports. For example, routing engine 34 analyzes routing information 40 and generates forwarding information 50 in accordance with routing information 40. Forwarding information 50 may be maintained in the form of one or more tables, link lists, radix trees, databases, flat files, or any other data structures.

The architecture of router 18 illustrated in FIG. 2 is shown for exemplary purposes only. The disclosure is not limited to this architecture. In other examples, router 18 may be configured in a variety of ways. In one example, some of the functionality of routing engine 34 and forwarding engine 36 may be distributed within IFCs 88.

Elements of control unit 32 may be implemented solely in software, or hardware, or may be implemented as combinations of software, hardware, or firmware. For example, control unit 32 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 32 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 18, e.g., protocols. Control unit 32, in some examples, retrieves and executes the instructions from memory for these aspects.

Figure 3:
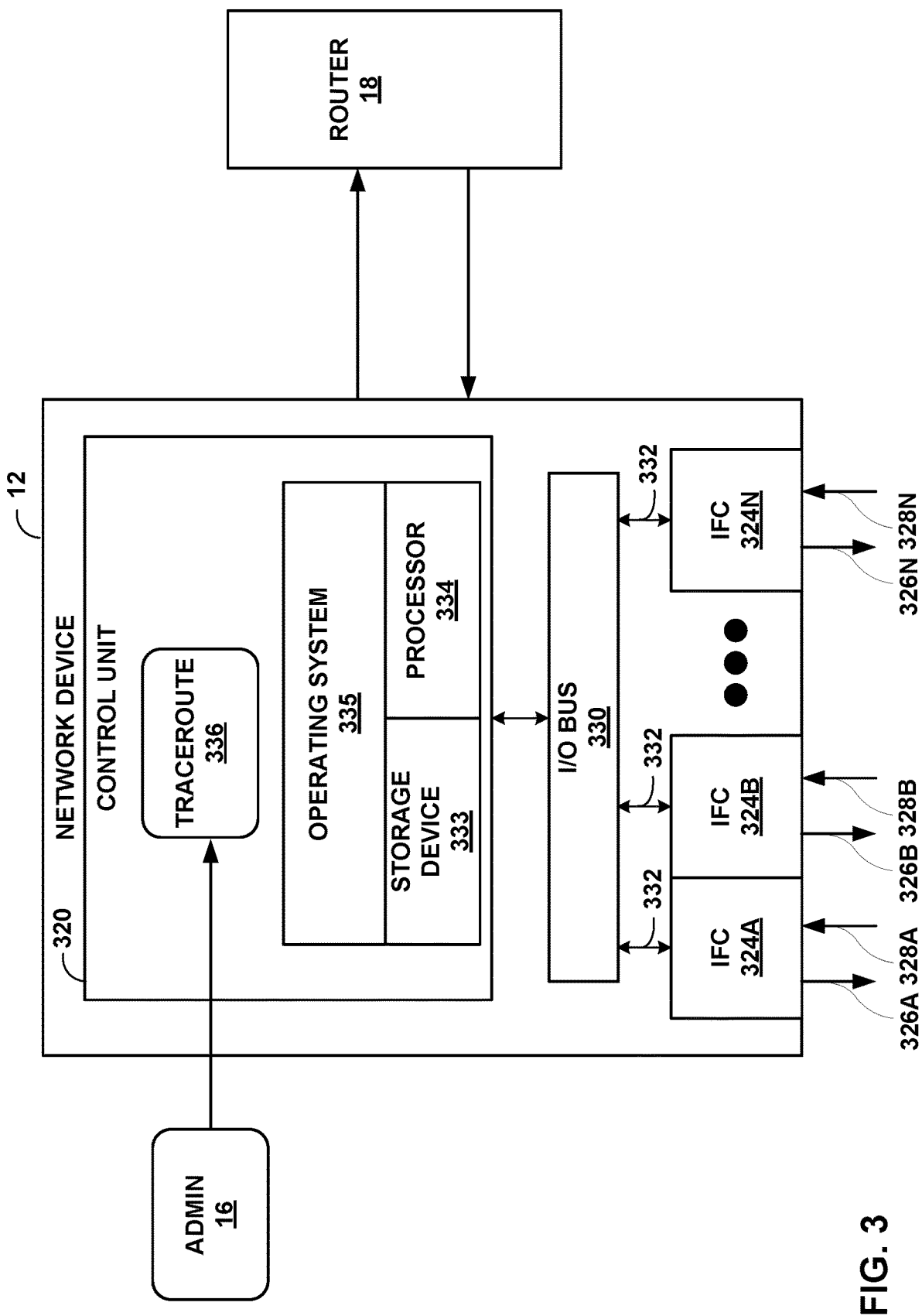
FIG. 3 is a block diagram illustrating an example of a network device, such as source network device of FIG. 1, that allows administrator to implement traceroute of a plurality of paths, in accordance with the techniques described herein.

FIG. 3 is a block diagram illustrating an example of a network device, such as source network device 12 of FIG. 1, that allows administrator 16 to implement an extended traceroute utility to identify network paths of a network device with a plurality of paths, in accordance with the techniques described herein.

In this example, source network device 12 includes interface cards 324A-324N (collectively, "IFCs 324") that send and receive packet flows via inbound network links 326A-326N (collectively, "inbound network links 326") and outbound network links 328A-328N (collectively, "outbound network links 328"), respectively. IFCs 324 are coupled to control unit 320 by an input/output bus 330. In general, control unit 320 provides an operating environment of executing software instructions stored within storage device 333.

For example, control unit 320 may include one or more programmable processors 334 capable of executing software instructions. Operating system 335, when executed by processor 334, provides an execution environment for software components, including diagnostic protocols such as traceroute 336. Traceroute 336 allows source network device 12 to output traceroute request packets, and receive traceroute response packets, as described herein. For example, traceroute 336 may construct a traceroute packet comprising an identifier for one or more paths from source network device 12 that are reachable to destination network device 14. In some examples, traceroute 336 may also construct the traceroute packet to include a network address of source network device 12.

Traceroute 336 may also determine from one or more indicators received from routers 18 the number of paths a router has to reach destination network device 14. Based on the indicator, traceroute 336 may determine whether source network device 12 has received a response from each of the plurality of paths of the router. If source network device 12 has not received a response for each of the paths of the router, traceroute 336 may prevent source network device 12 from configuring a new traceroute packet with an incremented TTL value and may wait until source network device 12 receives a response for all paths of the router. If source network device 12 has received a response for all paths of the router, traceroute 336 may configure a traceroute tree based on the responses, and may also increment the TTL value and configure another traceroute packet.

Although described with respect to a computer, the source network device or the target network device may be any form of network device, and either or both of the devices may have one or more unnumbered interfaces. Examples of other devices include servers, laptops, desktops, mobile devices, intrusion detection devices, virtual private network (VPN) appliances, routers, hubs, switches, gateways, firewalls, security devices and other network devices and appliances.

Figure 4:
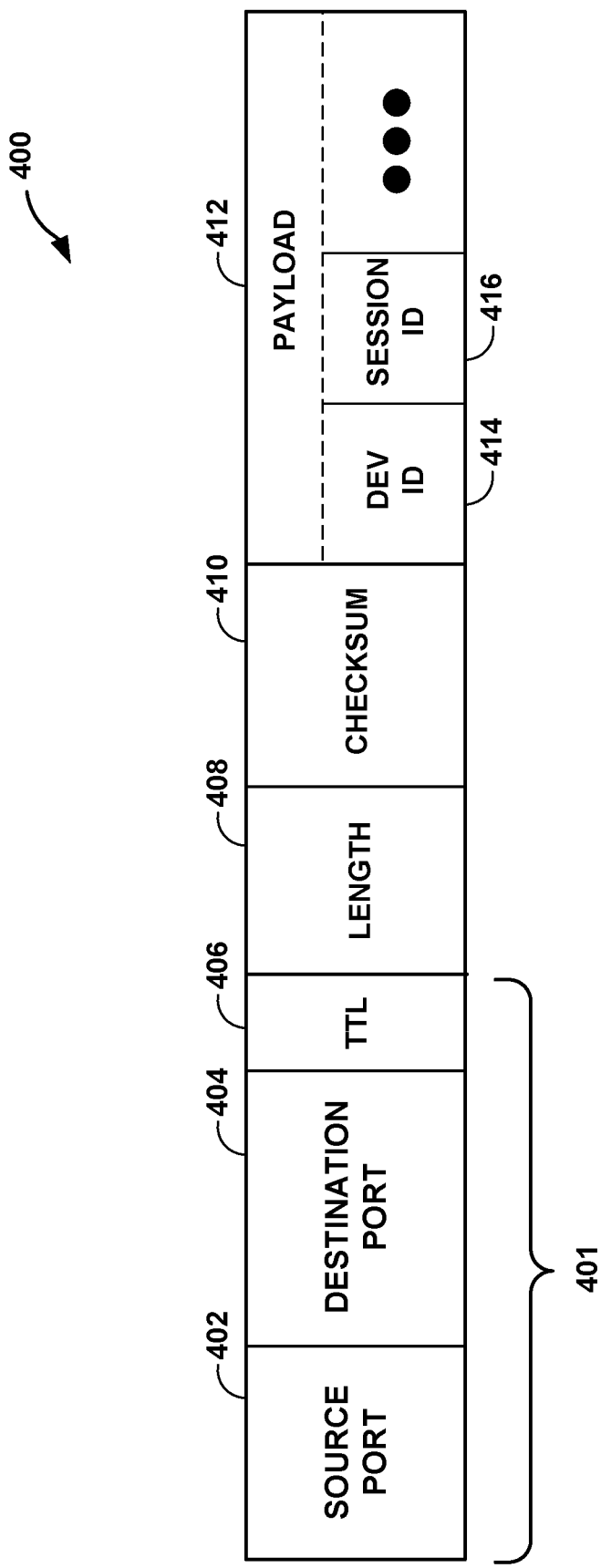
FIG. 4 is a block diagram illustrating an example format of a traceroute packet for use in tracing multiple paths, in accordance with the techniques described herein.

FIG. 4 is a block diagram illustrating an example format of a traceroute packet 400 for use in tracing multiple paths of a network device, in accordance with the techniques described herein. In the example of FIG. 4, traceroute packet 400 merely illustrated as an example and may include more or fewer data fields.

Traceroute packet 400 includes a header 401 including at least a source port field 402, a destination port field 404, and a TTL value field 406. Source port field 402 may include source information for purposes of routing. For example, source port field 402 may contain a source IP address of source network device 12. Destination port field 404 contains destination information. For example, destination port field 404 may contain a destination IP address of destination network device 14. The TTL field 410 may include a value that indicates a maximum number of hops the packet can traverse on the way to the packet's destination prior to expiration. Length field 408 may include the length of traceroute packet 400. Checksum field 410 may be calculated taking into account the entire traceroute packet 400. Further information regarding UDP and the packet format of UDP can be found in Request for Comments (RFC) 768, titled "User Datagram Protocol," dated Aug. 28, 1980, incorporated by reference herein.

Payload 412 may include a "session-stack" as described in this disclosure. For example, payload 412 may comprise a network device identifier ("DEV ID") field 414 and a session identifier ("SESSION ID") field 416. For example, when traceroute is initiated at a source network device, a network device may enter a network device identifier (e.g., an IP address) of the source network device into network device identifier field 412, and may enter a session number into session identifier field 414 to associate a particular path of the source network device that is reachable to the destination network device. As the packet traverses the network, an intermediate network device, e.g., router 18A, that receives traceroute packet 400 with TTL value field 406 having a TTL value greater than one may modify payload 412 to include its network address in network device identifier field 414 and a session number associated with a particular path of the intermediate network device in session identifier field 416. For example, router 18A may add to payload 412 its network address to device identifier field 412 and a respective session identifier associating with one of the paths to routers 18B and 18C in session identifier field 416. In this way, payload 410 may include a list of network addresses for source network device 12 and router 18A, and a respective session identifier to associate with the path to router 18B, for example.

Figure 5:
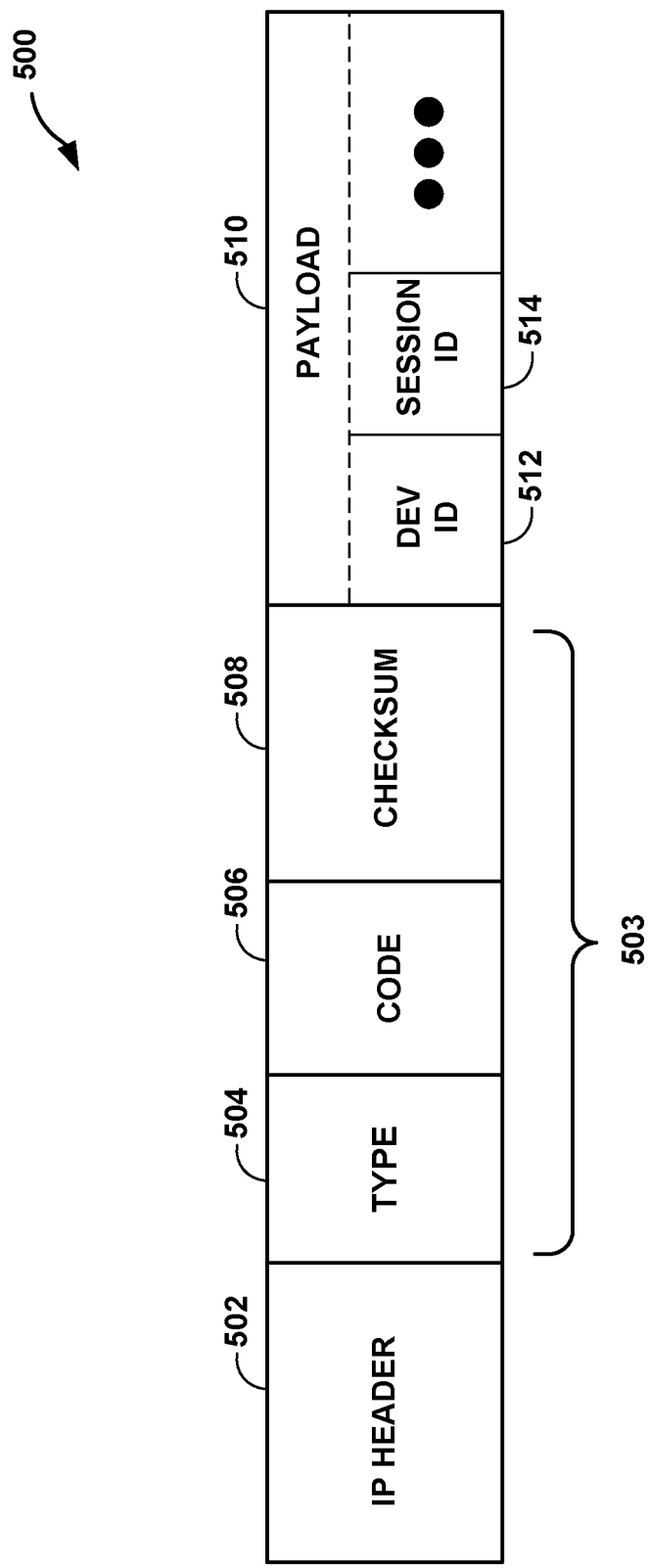
FIG. 5 is a block diagram illustrating an example format of a response packet for use in tracing multiple paths, in accordance with the techniques described herein.

FIG. 5 is a block diagram illustrating an example format of a response 500 for use in tracing multiple paths of a network device, in accordance with the techniques described herein. Response 500 may, for example, be structured similar to an ICMP time exceeded packet and is configured by traceroute module 42 of FIG. 2. Response 500 may include an IP header 502 that contains destination information for purposes of routing. For example, IP header 502 may contain a source IP address, a destination IP address, and a Time to Live (TTL) value that indicates a maximum number of hops the packet can traverse on the way to the packet's destination prior to expiration.

In addition, response 500 may include a header 503 having a type field 504, a code field 506, and a checksum 508. Type field 504 is used to identify the type of message. For example, a type value of "11" indicates that the packet is a time exceeded message. This type of packet is used by a traceroute utility to respond when a TTL value is zero. Code field 506 varies depending on the particular type of message, as specified by type field 504. For example, for a traceroute reply packet having type 11 ("time exceeded"), a code value of "0" indicates that the time to live expired while the packet was in transit. Checksum 508 may be calculated taking into account the entire packet. Further information regarding ICMP and the various packet formats of ICMP can be found in Request for Comments (RFC) 792, titled "Internet Control Message Protocol," prepared by the Network Working Group of the Internet Engineering Task Force (IETF), dated September 1981, incorporated by reference herein.

Payload 510 is extended to include a reverse-session-stack" as described in this disclosure. For example, payload 510 may comprise a network device identifier ("DEV ID") field 512 and a session identifier ("SESSION ID") field 514. When a target network device receives a traceroute packet with an IP header having a TTL value of one, the target network device may configure a traceroute response packet 500 with payload 510 copied from the payload of a traceroute packet (as described in FIG. 4) received from a previous-hop. That is, the one or more device identifiers and one or more session identifiers included in the received traceroute packet is included in a payload 510 of response 500.

Figure 6:
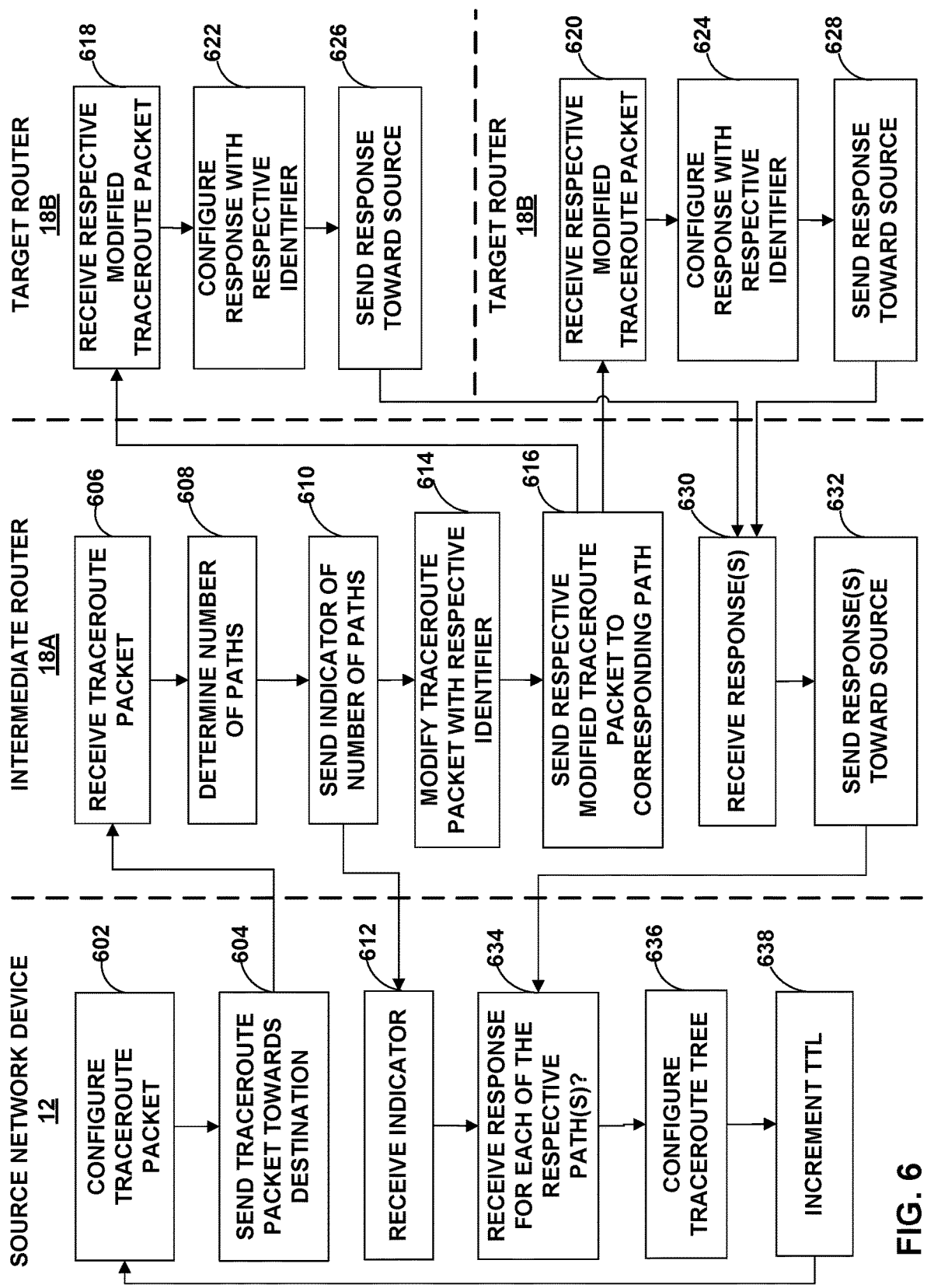
FIG. 6 is a flowchart illustrating an example operation of network system, in accordance with the techniques described in this disclosure.

FIG. 6 is a flowchart illustrating an example operation of network system 10, in accordance with the techniques described in this disclosure. For illustration purposes, FIG. 6 is explained with reference to source network device 12 of FIGS. 1 and 3, and routers 18A-18C of FIGS. 1 and 2. Although the examples described below are illustrated with respect to routers 18A-18C of FIGS. 1 and 2, any of routers 18 may perform the described examples.

Source network device 12 may configure a traceroute packet including an identifier associated with one or more paths from source network device 12 to destination network device and a TTL value (602). For example, an administrator may invoke the traceroute utility 336 of source network device 12 to configure a traceroute packet to include an identifier having a session-stack comprising a network address of source network device 12 and a session identifier to associate the one or more paths from the source network device to the destination network device. Source network device 12 may send the traceroute packet upstream towards destination network device 14 (604).

An intermediate network device, e.g., router 18A, may receive the traceroute packet (606). As further described in FIG. 6, router 18A may determine, based on the TTL value included with the traceroute packet, whether to forward the traceroute packet or to construct a response to the traceroute packet. In this example, router 18A may be illustrated to forward the traceroute packet.

Prior to forwarding the traceroute packet, router 18A may determine a number of paths of router 18A that may reach the destination (608). In one example, router 18A may configure an indicator that includes the number of the paths for router 18A. In this example, router 18A may include an indicator representing the number of paths to routers 18B and 18C. In some examples, the indicator may further include one or more network addresses of next-hop devices on the paths, such as network addresses of routers 18B and 18C.

Router 18A may send the indicator to source network device 12 (610). Source network device 12 may receive the indicator (612). Source network device 12 may determine based on the indicator the number of paths of router 18A.

Router 18A may modify a payload of the traceroute packet to include a respective identifier associated with a corresponding path of router 18A (614). For example, router 18A may configure one respective modified traceroute packet including a session-stack comprising a network address of router 18A and a respective session identifier to associate a corresponding path to router 18B. Router 18A may also configure another respective modified traceroute packet including a session-stack comprising the network address of router 18A and a respective session identifier to associate a corresponding path to router 18C. That is, router 18A may construct respective modified traceroute packets for corresponding paths of router 18A. Router 18A may send the respective modified traceroute packets to their corresponding paths to target routers 18B and 18C (616).

Target routers 18B and 18C may each receive a respective modified traceroute packet (618, 620). Each of routers 18B and 18C may, when the TTL value is one, configure a response to the modified traceroute packet (622, 624). As further described in FIG. 6, the received modified traceroute packet is forwarded to a control plane of the target network device such that the target network device may configure a response. In one example, the response may include a reverse-session-stack copied from the session-stack received from router 18A. That is, the response for router 18B may include network addresses for source network device 12 and intermediate router 18A, and a session identifier associating the path from intermediate router 18A to target router 18B. Similarly, the response for router 18C may include network addresses for source network device 12 and intermediate router 18A, and a session identifier associating the path from intermediate router 18A to target router 18C.

Routers 18B and 18C may each send its response toward source network device 12 (626, 628). For example, in response to configuring the response, each of routers 18B and 18C may forward the response to its forwarding engine to forward the response on an outbound interface link to router 18A.

Intermediate router 18A may receive the responses (630). Router 18A may receive the responses in parallel or sequentially. In any event, router 18A may send the responses from routers 18B and 18C toward source network device 12 (632).

Source network device 12 may receive the responses on any of inbound interface links 328 and may determine whether source network device 12 has received a response for each of the plurality of network paths of a network device based on the received indicator (634). For example, based on the received indicator, the traceroute utility 336 of source network device 12 may determine that source network device 12 expects to receive a response for the path from router 18A to router 18B and another response for the path from router 18A to router 18C. In response to receiving a response for each of the network paths of router 18A, source network device 12 may then configure a traceroute tree based on the received responses (636), and configure a new traceroute packet with an incremented TTL value for which source network device 12 may send toward destination network device 14 (638). Source network device 12 may continue the process until receiving a response from a destination network device.

Figure 7:
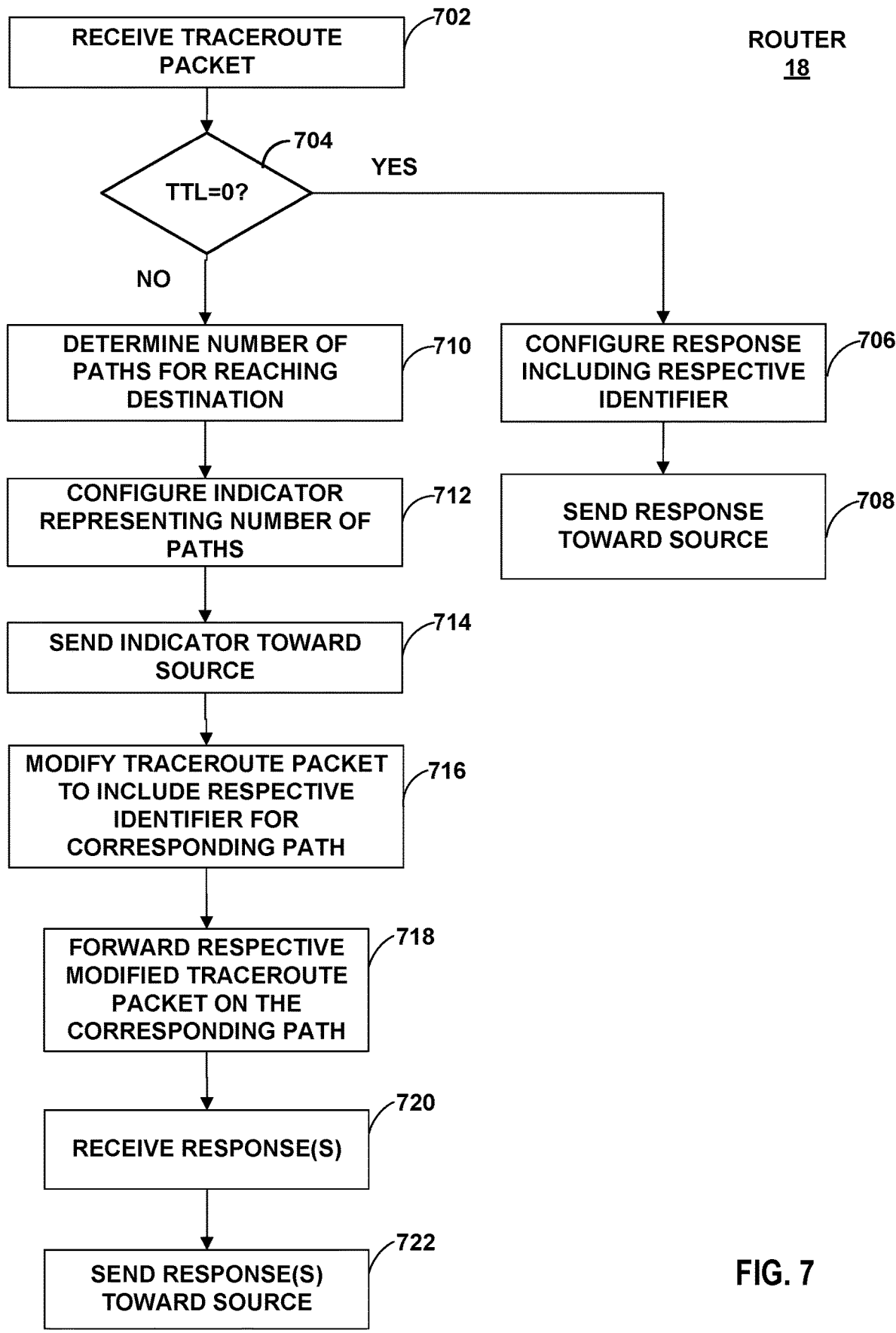
FIG. 7 is a flowchart illustrating an example operation of network device, in accordance with the techniques described in this disclosure.

FIG. 7 is a flowchart illustrating an example operation of router 18, in accordance with the techniques described in this disclosure. Router 18 of FIG. 7 may represent any of routers 18 of FIGS. 1 and 2.

Router 18 may receive a traceroute packet including a TTL value from one of inbound network links 90 (702). The forwarding engine 36 of router 18 may decrement the TTL value and determine whether the TTL value is zero (704). If the TTL value is zero, router 18 may forward the traceroute packet to routing engine 34 such that traceroute module 42 may construct a response to the traceroute packet.

Traceroute module 42 of router 18 may construct a response including a respective identifier received from the traceroute packet (706). For example, router 18 may receive a traceroute packet that includes in its payload a session-stack comprising one or more network addresses of network devices that forwarded the traceroute packet and/or one or more session identifiers associated with paths for which the traceroute packet was forwarded on. In one example, router 18 may construct an extended TTL expired message including in a payload of the message a reverse-session-stack that copies the session-stack of the received traceroute packet. That is, the response may include the one or more network addresses of network devices that forwarded the traceroute packet and the one or more session identifiers associated with paths for which the traceroute packet was forwarded. Router 18 may forward the response to forwarding engine 36 to send the response on any of outbound links 92 toward source network device 12 (708).

If the TTL value is not zero, then router 18 may determine a number of paths it has for reaching destination network device 14 (710). For example, traceroute module 42 of router 18 may perform a destination lookup to determine the paths reachable to destination network device 14. Traceroute module 42 may configure an indicator comprising the number of paths (712). In one example, router 18 may use traceroute module 42 to configure the indicator as a new utility PDU including the number of paths of router 18. In some examples, the new utility PDU may include one or more network addresses of next-hop network devices on the paths of router 18. Router 18 may send the indicator on any of outbound links 92 toward source network device 12 (714).

Traceroute module 42 of router 18 may modify a payload of the traceroute packet to include a respective identifier for a corresponding path of router 18 (716). In one example, traceroute module 42 may modify the payload to include a session-stack comprising at least a network address of router 18 and a session identifier associated with a corresponding path of router 18 that may reach destination network device 14.

Router 18 may forward the respective modified traceroute packet on the corresponding paths (718). For example, traceroute module 42 may forward the respective modified traceroute packets to forwarding engine 36 to forward the respective modified traceroute packets on any of outbound links 92 toward the corresponding paths to the next-hops.

Forwarding engine 36 of router 18 may receive one or more responses to the modified traceroute packet on any of inbound links 90 (720). Forwarding engine 36 of router 18 may identify from the response packet header that the responses are to be forward to source network device 12 on any of outbound links 92 toward source network device 12 (722).

Figure 8:
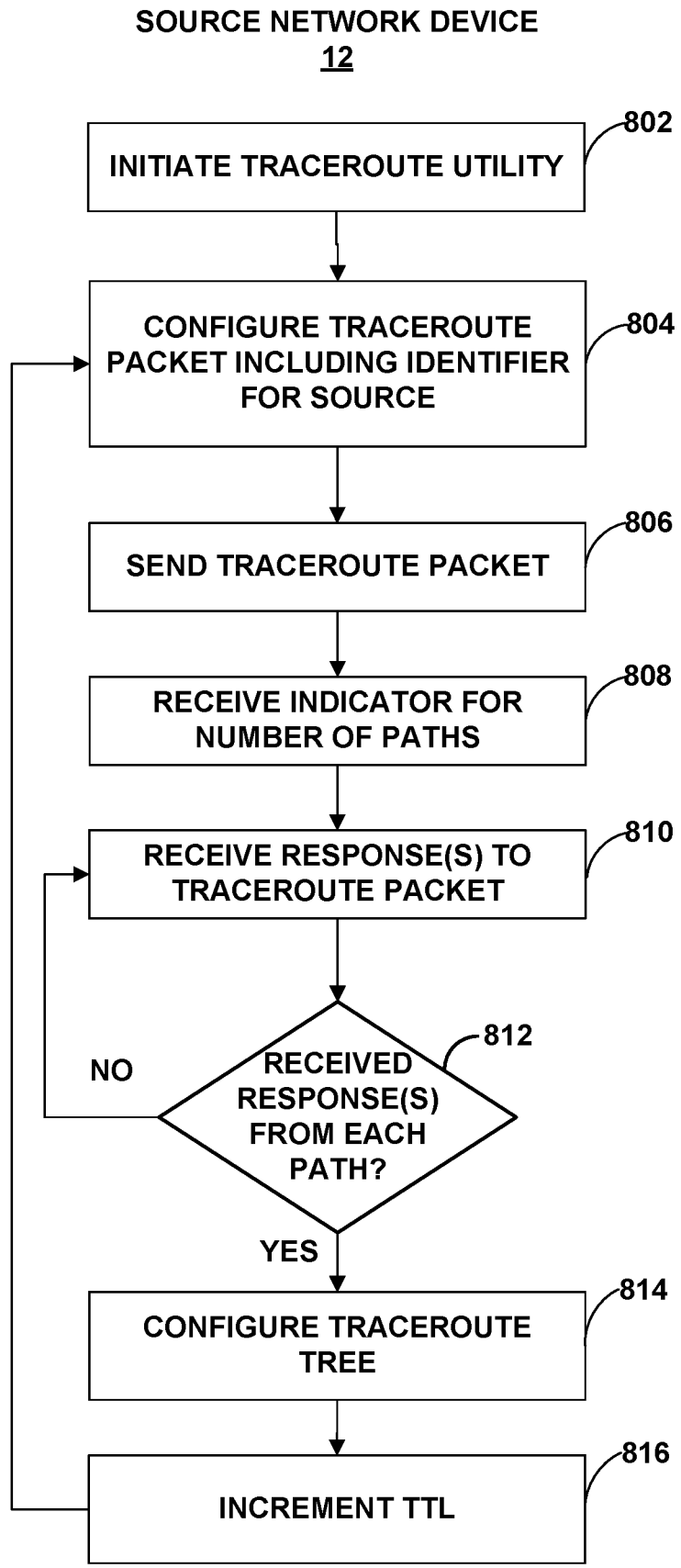
FIG. 8 is a flowchart illustrating an example operation of source network device, in accordance with the techniques described in this disclosure.

FIG. 8 is a flowchart illustrating an example operation of source network device 12, in accordance with the techniques described in this disclosure. In the example of FIG. 8, source network device 12 represents source network device 12 of FIGS. 1 and 3.

An administrator may use source network device 12 to initiate a traceroute utility 336 (802). Source network device 12 may configure a traceroute packet including a network identifier for a path available to source network device 12 to reach the destination network device (804). For example, source network device 12 may configure a payload of a traceroute packet with a "session-stack" comprising the network address of source network device 12 and/or a respective session identifier associated with the next-hop path from source network device 12. Source network device 12 may also configure a TTL value to indicate a maximum number of hops the packet can traverse on the way to the packet's destination prior to expiration.

Source network device 12 sends the traceroute packet and TTL value via any of outbound links 328 towards destination network device 14 (806). For example, source network device 12 may use the UDP protocol to communicate the traceroute packet as described herein to illicit responses from a target network device, e.g., router 18, along the path to the destination network device.

As the traceroute packet traverses through the network, source network device 12 may receive an indicator from an intermediary router including a number of paths available to the router for reaching the destination network device (808). In some examples, the indicator may also include one or more network addresses of next-hop routers on those paths.

Source network device 12 may receive one or more responses to the traceroute packet on any of inbound links 326 (810). Traceroute 336 of source network device 12 may determine based on the indicator received from the intermediary router whether source network device 12 has received a response from each of the plurality of paths of the intermediary router (812). If source network device 12 has not received a response for each of the paths of the intermediary router, source network device 12 may not configure a new traceroute packet with an incremented TTL value and may wait to receive one or more additional responses to the traceroute packet (810). If source network device 12 has received a response for each of the plurality of paths of the intermediary router, source network device 12 may configure a traceroute tree based on the received one or more responses for each path of the intermediary router (814), and may also increment the TTL value (814) and configure another traceroute packet (804).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the invention have been described. These and other examples are within the scope of the following claims.

What is claimed is:

1. A method comprising:
  receiving, by a network device coupled to a plurality of paths for reaching a destination network device and positioned between a source network device and the destination network device, a traceroute request packet to identify the plurality of paths for reaching the destination network device, the traceroute request packet originating from the source network device;
  based on receiving the traceroute request packet:
    sending, by the network device and to the source network device, a message specifying an indicator representing a number of the plurality of paths from the network device to the destination network device;
    for each of the plurality of paths, modifying, by the network device, a payload of the traceroute request packet to construct a respective modified traceroute request packet for a corresponding path of the plurality of paths, wherein a payload of the modified traceroute request packet includes a session identifier to indicate the corresponding path for which the modified traceroute request packet is to be forwarded for a particular traceroute session of a plurality of traceroute sessions for tracing the plurality of paths; and
    forwarding, by the network device, a corresponding one of the modified traceroute request packets on each of the corresponding paths of the plurality of paths.

2. The method of claim 1, wherein the traceroute request packet originating from the source network device specifies information comprising:

one or more network addresses of one or more intermediate network devices that forwarded the traceroute request packet on a path to the network device, wherein the one or more intermediate network devices are positioned between the network device and the source network device; and one or more session identifiers associated with the path to the network device for which the one or more intermediate network devices forwarded the traceroute request packet.

3. The method of claim 1, wherein modifying the payload of the traceroute request packet further comprises modifying the payload of the traceroute request packet to include a network address of the network device.

4. The method of claim 1, wherein the message further includes one or more network addresses of one or more next-hops on the plurality of paths of the network device.

5. The method of claim 1, wherein the plurality of paths comprises a plurality of Equal Cost Multi-Path (ECMP) paths.

6. The method of claim 1, wherein the traceroute request packet comprises a User Datagram Protocol packet.

7. A method comprising:
sending, by a source network device, a first traceroute request packet to identify a plurality of paths for reaching a destination network device, to an intermediate network device coupled to the plurality of paths for reaching the destination network device, wherein the intermediate network device is positioned between the source network device and the destination network device;

receiving, by the source network device and from the intermediate network device, two or more traceroute response packets, wherein each of the two or more traceroute response packets comprises a payload including a corresponding session identifier to indicate a corresponding path of the plurality of paths for which the first traceroute request packet was forwarded for a particular traceroute session of a plurality of traceroute sessions for tracing the plurality of paths;

receiving, by the source network device and from the intermediate network device in based on the first traceroute request packet, a message specifying an indicator representing a number of the plurality of paths of the intermediate network device;

determining, by the source network device and based on the indicator specified by the received message, whether the source network device has received a corresponding traceroute response packet for each of a plurality of traceroute request packets generated by the intermediate network device and output on respective ones of the plurality of paths toward the destination network device; and based on determining the source network device has received the corresponding traceroute response packet for each of the plurality of paths, sending, by the source network device, a second traceroute request packet with an incremented time to live (TTL) value relative to a TTL value of the first traceroute request packet.

8. The method of claim 7, wherein each of the two or more traceroute response packets comprises network addresses of two or more network devices that forwarded the first traceroute request packet on the corresponding path.

9. The method of claim 7, further comprising:
based on determining the source network device has received the corresponding traceroute response packet for each of the plurality of paths, constructing, by the source network device and based on the corresponding traceroute response packets, a traceroute tree that includes each of the plurality of paths.

10. A network device comprising:
one or more processors configured to:
receive a traceroute request packet to identify a plurality of paths for reaching a destination network device, the traceroute request packet originating from a source network device, wherein the network device is coupled to the plurality of paths and is positioned between the source network device and the destination network device;
based on receiving the traceroute request packet:
send, to a source network device, a message specifying an indicator representing a number of the plurality of paths from the network device to a destination network device, the traceroute request packet originating from the source network device;
for each path of the plurality of paths, modify a payload of the traceroute request packet to construct a respective modified traceroute request packet for a corresponding path of the plurality of paths, wherein a payload of the modified traceroute request packet includes a session identifier to indicate the corresponding path for which the modified traceroute request packet is to be forwarded for a particular traceroute session of a plurality of traceroute sessions for tracing the plurality of paths; and
forward a corresponding one of the modified traceroute request packets on each of the corresponding paths of the plurality of paths.

11. The network device of claim 10, wherein the traceroute request packet originating from the source network device specifies information comprising:
one or more network addresses of one or more intermediate network devices that forwarded the traceroute request packet on a path to the network device, wherein the one or more intermediate network devices are positioned between the network device and the source network device; and
one or more session identifiers associated with the path to the network device for which the one or more intermediate network devices forwarded the traceroute request packet.

12. The network device of claim 10, wherein to modify the payload of the traceroute request packet to include the identifier for the corresponding path, the one or more processors are further configured to modify the payload of the traceroute request packet to include a network address of the network device.

13. The network device of claim 10, wherein the message includes one or more network addresses of one or more next-hops on the plurality of paths of the network device.

14. The network device of claim 10, wherein the plurality of paths comprises a plurality of Equal Cost Multi-Path (ECMP) paths.

15. The network device of claim 10, wherein the traceroute request packet comprises a User Datagram Protocol packet.

16. Non-transitory computer-readable media comprising instructions that, when executed, are configured to cause processing circuitry of a network device to:
receive a traceroute request packet to identify a plurality of paths for reaching a destination network device, wherein the network device is coupled to the plurality of paths for reaching the destination network device and positioned between a source network device and the destination network device, the traceroute request packet originating from the source network device;

based on receiving the traceroute request packet:
- send, to the source network device, a message specifying an indicator representing a number of the plurality of paths from the network device to the destination network device;
- for each of the plurality of paths modify a payload of the traceroute request packet to construct a respective modified traceroute request packet for a corresponding path of the plurality of paths, wherein a payload of the modified traceroute request packet includes a session identifier to indicate the corresponding path for which the modified traceroute request packet is to be forwarded for a particular traceroute session of a plurality of traceroute sessions for tracing the plurality of paths; and
- forward a corresponding one of the modified traceroute request packets on each of the corresponding paths of the plurality of paths.

17. The non-transitory computer-readable media of claim 16, wherein the traceroute request packet originating from the source network device specifies information comprising:
- one or more network addresses of one or more intermediate network devices that forwarded the traceroute request packet on a path to the network device, wherein the one or more intermediate network devices are positioned between the network device and the source network device; and
- one or more session identifiers associated with the path to the network device for which the one or more intermediate network devices forwarded the traceroute request packet.

18. The non-transitory computer-readable media of claim 16, wherein to modify the payload of the traceroute request packet to include the identifier for the corresponding path, the instructions are configured to cause processing circuitry of the network device to modify the payload of the traceroute request packet to include a network address of the network device.

19. The non-transitory computer-readable media of claim 16, wherein the message includes one or more network addresses of one or more next-hops on the plurality of paths of the network device.

20. The non-transitory computer-readable media of claim 16, wherein the plurality of paths comprises a plurality of Equal Cost Multi-Path (ECMP) paths.

* * * * *